United States Patent

Wong

Patent Number: 5,486,252
Date of Patent: Jan. 23, 1996

[54] METHOD OF ADHESIVELY BONDING A SEAT COVER TO A SEAT CUSHION

[75] Inventor: Daniel K. C. Wong, Rochester Hills, Mich.

[73] Assignee: General Motors Corporation, Detroit, Mich.

[21] Appl. No.: 209,800

[22] Filed: Mar. 14, 1994

[51] Int. Cl.[6] .................................................. B32B 31/20
[52] U.S. Cl. ........................ 156/212; 156/222; 156/285; 156/322; 156/499; 156/311; 292/DIG. 2
[58] Field of Search ..................................... 156/212, 213, 156/222, 499, 322, 214, 581, 311, 285; 297/DIG. 1, DIG. 2; 219/243, 528, 529

[56] References Cited

U.S. PATENT DOCUMENTS

| | | | |
|---|---|---|---|
| 2,335,624 | 11/1943 | Weir | 156/499 |
| 2,387,566 | 10/1945 | Custers | 156/499 |
| 3,368,323 | 2/1968 | Wood | 156/499 |
| 3,408,242 | 10/1968 | Rochla | 156/499 |
| 3,607,544 | 9/1971 | Earner | 156/322 |
| 4,665,606 | 5/1987 | Saito et al. | 29/448 |
| 4,667,084 | 5/1987 | Regge | 219/301 |
| 4,737,226 | 4/1988 | Inoue | 156/245 |
| 4,874,448 | 10/1989 | Urai | 156/196 |
| 4,894,112 | 1/1990 | Lippman | 156/499 |
| 4,919,744 | 4/1990 | Newman | 219/529 X |
| 4,925,513 | 5/1990 | Witzke et al. | 156/245 |
| 4,975,135 | 12/1990 | Lowe | 156/155 |
| 5,000,805 | 3/1991 | Lowe | 156/90 |
| 5,087,311 | 2/1992 | Elliott et al. | 156/212 |
| 5,286,325 | 2/1994 | Miyota et al. | 156/212 |
| 5,407,510 | 4/1995 | Marfilius et al. | 156/212 |

FOREIGN PATENT DOCUMENTS 57-46853  3/1982  Japan ..................................... 156/322

*Primary Examiner*—Michelle K. Yoder
*Attorney, Agent, or Firm*—Ernest E. Helms

[57] ABSTRACT

A method of bonding a contoured seat cover with a first surface to a seat cushion with a second surface is provided which includes the steps of coating the second surface with a heat-activated adhesive, placing a flexible planar heating member between the first and second surfaces, pressing the first and second surfaces together against the heater with a force of one to five pounds per square inch, heating the adhesive with the heating member, removing the heating member while the first and second surfaces are pressed together, and allowing the adhesive to solidify and then relieving the pressure between the seat cover and the seat cushion.

6 Claims, 1 Drawing Sheet

METHOD OF ADHESIVELY BONDING A SEAT COVER TO A SEAT CUSHION

FIELD OF THE INVENTION

The field of the present invention is that of methods for bonding a membrane cover to an automotive vehicle seat cushion.

BACKGROUND OF THE INVENTION

There are various ways to bond a contoured seat cover to a seat cushion. One of the ways is usage of a thermally-activated adhesive such as a polyamide hot melt for the bonding operation. In certain seat styles where it is desirable to bond a large surface area of the cover to the seat cushion, a technique which has been utilized is to spray a hot melt adhesive on the seat cushion or cover and then join the two members together. This technique has run into difficulty since the sprayed adhesive often cools too quickly for the seat cover to be properly bonded to the cushion. To overcome this problem, the sprayer is set to spray a heavier amount of hot melt adhesive. However, the end result is too often a lumpy feeling underneath the seat cover after the adhesive has solidified. Another technique which has been tried is to apply the adhesive between the cover and the cushion and then use heated dies or steam. This technique has great troubles since the heated die or hot steam often distorts the color and/or the nap of the fabric. Additionally, with leather or vinyl seat covers, the steam technique cannot be utilized since the steam cannot pass through impermeable covers.

SUMMARY OF THE INVENTION

To overcome the above-noted problems, the present invention is brought forth. In the present invention, a preferred embodiment provides spraying a contoured seat cushion or seat cover with a heat-activated adhesive. A flexible heating element is then placed on the adhesive surface and the heating member is sandwiched between the seat cushion and the cover. Pressure is applied, and when the adhesive is sufficiently heated to a working temperature, the heater is removed while pressure is still being applied. Then, the cover and the seat cushion are allowed to cool under pressure until such time as necessary for the adhesive to solidify.

DESCRIPTION OF THE PREFERRED EMBODIMENTS

Figure 1:
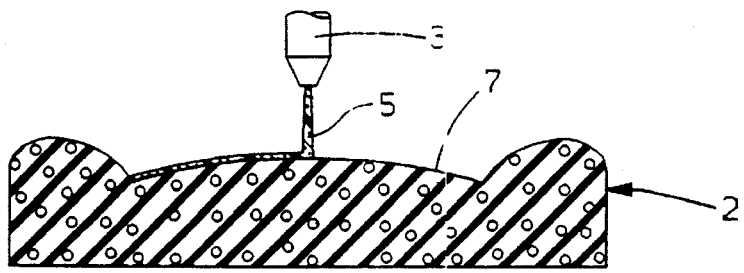
FIG. 1 is a sectional view of the hot melt adhesive being sprayed on a vehicle seat cushion.
Figure 2:
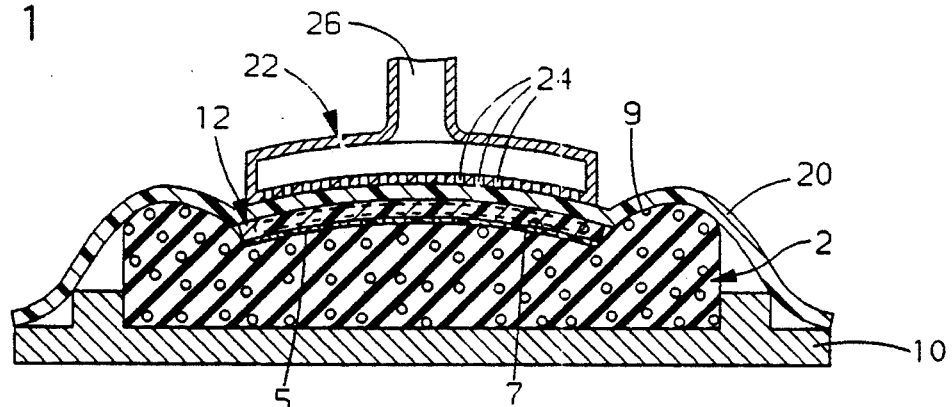
FIG. 2 illustrates the seat cushion shown in FIG. 1 held within a fixture with a flexible heater being applied over the seat cushion and the flexible heater being sandwiched between the seat cushion and a membrane seat cover held in position by an overhead press.
Figure 3:
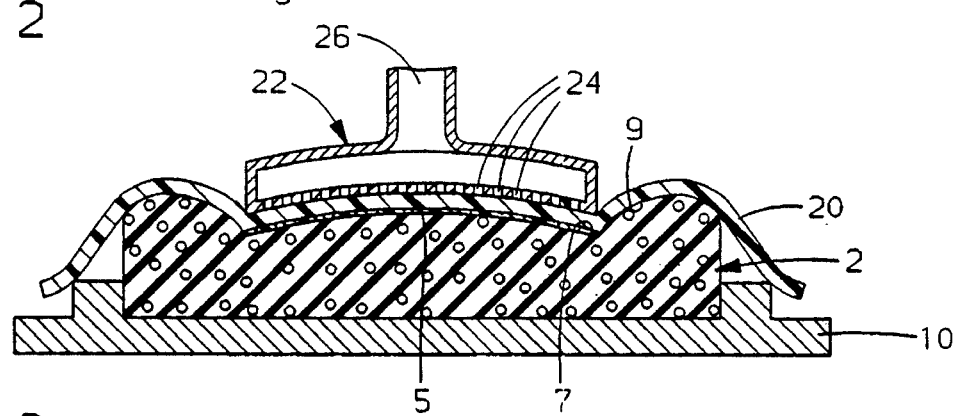
FIG. 3 is a view similar to FIG. 2 illustrating the seat cushion and cover after the flexible heater has been removed.
Figure 4:
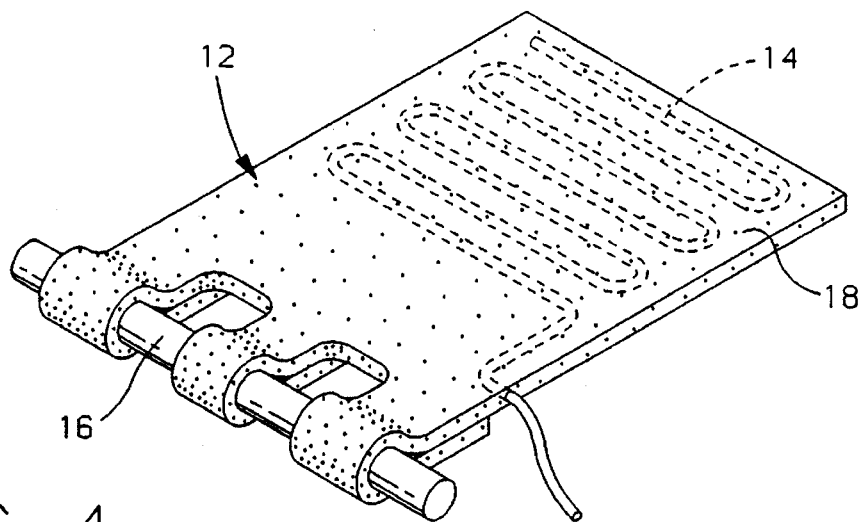
FIG. 4 is a perspective view of the flexible heater utilized.

Referring to FIG. 1, a heat-activated adhesive 5 typically of the polyamide type is applied to a contoured automotive seat cushion 2 surface 7. A sprayer 3, typically a swirl type, which utilizes pressurized air deposits a thin coating of the hot melt adhesive 5. The working temperature of the adhesive when sprayed is typically around 350° F. to 375° F. The seat cushion 2 utilized can be made of cellular urethane or bonded synthetic fibers or natural fibers. The seat cushion 2 is then placed in a lower locating fixture 10, and a flexible heating element 12 is then placed over a portion of the seat cushion 2 (the adhesive 5 having been previously applied). The heating element 12 should be flexible and as shown is a flexible silicone heater 12. Since the heater 12 is made from silicone, any residual adhesive 5 that may transfer to it may be easily removed.

The heater 12 is heated by an electric coil 14 and has a handle 16 at one end. The heater 12 has a heating portion 18 which approximates the size of the seat cushion material to which the adhesive 5 is applied. The handle 16 and its adjacent portion will remain outside of the sandwich created by a membrane seat cover 20 and the seat cushion 2 so that it may easily be pulled out when required. A thermocouple (not shown) built inside the heater 12 automatically controls the maximum temperature of the heater 12. A seat cover 20 is laid on top of the heater 12. The seat cover 20 may be free of adhesive 5 or, if desired, may have adhesive 5 applied thereto on a surface 9 facing the cushion 2. The seat cover 20 may be cloth, vinyl, leather or several combinations in between.

To press the cover 20 toward the seat cushion 2, there is provided a press fixture 22. Press fixture 22 may be manipulated by any suitable mechanism such as a dedicated machine or a robot (not shown). Press fixture 22 will then press down on the cover 20 in the neighborhood of one to five pounds per square inch, preferably one to two pounds per square inch. The configuration of the press fixture 22 should preferably match the contour of the seat cushion 2.

The temperature of the heater 12 should be approximately 380° F. to 390° F. for a working temperature of the polyamide type of hot melt adhesive. The heater 12 should be removed as the adhesive 5 is heated to the same temperature since prolonged heat exposure of the polyamide type of adhesive 5 in this range of temperature will slowly degrade and char the adhesive. The degradation of the adhesive is dependent upon a time and temperature relationship.

After the heater 12 is removed, the covered seat cushion and cover assembly is allowed to cool. To aid in this cooling, holes 24 are 0.06 to 0.1 inch in diameter and spread from about 0.5 to 0.75 inch apart to allow forced room temperature air to cool the cover surface while the whole seat assembly is in the fixture 10. The forced air movement may be created by blowing air onto the cover 20. After the bonding process has been achieved, typically 45 seconds to one minute, the press fixture 22 is removed and the cushion with the cover attached thereto is removed from the fixture 10.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A method of bonding a contoured steam-impermeable seat cover with a first surface to a seat cushion with a second surface comprising:

coating the second surface with a heat-activated adhesive;

placing a flexible planar electric coil heating member between the first and second surfaces;

pressing the first and second surfaces together against the heater with a force of one to five pounds per square inch with a press fixture with an internal cavity with venting holes connected thereto, the press fixture having a contour matching the seat cushion;

heating the adhesive with the heating member to a working to a working temperature of the adhesive;

removing the heating member while the first and second surfaces are still pressed together; and allowing the adhesive to solidify by blowing forced air passing through the press fixture holes onto the cover and then relieving the pressure between the seat cover and the seat cushion.

2. A method as described in claim 1 wherein the coating is achieved by spraying.

3. A method as described in claim 2 wherein the spraying is swirl spraying.

4. A method as described in claim 1 wherein the pressure is from one to two pounds per square inch.

5. A method as described in claim 1 wherein a polyamide adhesive is utilized.

6. A method as described in claim 1 utilizing a silicone sheet heater.

* * * * *